United States Patent
Natroshvili et al.

(10) Patent No.: US 10,650,553 B2
(45) Date of Patent: May 12, 2020

(54) METHOD OF IMAGE PROCESSING AND IMAGE PROCESSING DEVICE

(71) Applicant: Intel IP Corporation, Santa Clara, CA (US)

(72) Inventors: Koba Natroshvili, Waldbronn (DE); Okan Köse, Karlsruhe (DE)

(73) Assignee: INTEL IP CORPORATION, Santa Clara, CA (US)

(*) Notice: Subject to any disclaimer, the term of this patent is extended or adjusted under 35 U.S.C. 154(b) by 203 days.

(21) Appl. No.: 15/854,863

(22) Filed: Dec. 27, 2017

(65) Prior Publication Data

US 2019/0051016 A1 Feb. 14, 2019

(51) Int. Cl.
| | |
|---|---|
| *G06K 9/00* | (2006.01) |
| *G06T 7/00* | (2017.01) |
| *G01C 22/02* | (2006.01) |
| *G06T 7/579* | (2017.01) |
| *G01P 3/36* | (2006.01) |
| *G01P 3/38* | (2006.01) |
| *G06T 7/277* | (2017.01) |
| *G06T 7/246* | (2017.01) |
| *G08G 1/16* | (2006.01) |

(52) U.S. Cl.
CPC .............. *G06T 7/97* (2017.01); *G01C 22/025* (2013.01); *G01P 3/36* (2013.01); *G01P 3/38* (2013.01); *G06T 7/246* (2017.01); *G06T 7/277* (2017.01); *G06T 7/579* (2017.01); *G08G 1/16* (2013.01); *G06T 2207/10016* (2013.01); *G06T 2207/20076* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,710,246 B2 * | 5/2010 | Arakawa | B62D 15/029 180/271 |
| 8,473,144 B1 * | 6/2013 | Dolgov | B60W 30/095 701/28 |
| 8,751,154 B2 * | 6/2014 | Zhang | B60W 30/09 701/411 |

(Continued)

OTHER PUBLICATIONS

Ortin et al., "Indoor robot motion based on monocular images", May 2002, Dpto. Informática e Ingeniería de Sistemas, Zaragoza.

(Continued)

*Primary Examiner* — Shervin K Nakhjavan
(74) *Attorney, Agent, or Firm* — Viering, Jentschura & Partner MBB

(57) ABSTRACT

A method of image processing is provided. The method may include: determining a candidate tuple from at least two images that are taken at different times, wherein the candidate tuples are determined using at least odometry sensor information. The couple of subsequent images have been detected by a moving image sensor moved by a vehicle. The odometry sensor information is detected by a sensor moved by the vehicle. The method may further include classifying the candidate tuples into a static tuple or a dynamic tuple. The static tuple represents a static object within the couple of subsequent images, and the dynamic tuple represents a moving object within the couple of subsequent images.

19 Claims, 8 Drawing Sheets

(56) References Cited

U.S. PATENT DOCUMENTS

| | | | | |
|---|---|---|---|---|
| 8,933,931 B2* | 1/2015 | Balan | ............... | G06T 19/006 |
| | | | | 345/419 |
| 2005/0195096 A1* | 9/2005 | Ward | ............... | G01C 21/32 |
| | | | | 340/995.14 |
| 2006/0177103 A1* | 8/2006 | Hildreth | ............... | G06F 1/1626 |
| | | | | 382/107 |
| 2007/0047809 A1* | 3/2007 | Sasaki | ............... | G06K 9/00791 |
| | | | | 382/170 |
| 2009/0268946 A1* | 10/2009 | Zhang | ............... | G06K 9/00791 |
| | | | | 382/104 |
| 2009/0303026 A1* | 12/2009 | Broggi | ............... | G01S 17/023 |
| | | | | 340/435 |
| 2010/0201816 A1* | 8/2010 | Lee | ............... | B60R 1/12 |
| | | | | 348/148 |
| 2010/0283662 A1* | 11/2010 | Fox | ............... | G01S 7/2922 |
| | | | | 342/53 |
| 2014/0368493 A1* | 12/2014 | Rogan | ............... | G01S 17/50 |
| | | | | 345/419 |
| 2017/0124476 A1* | 5/2017 | Levinson | ............... | G05D 1/0088 |
| 2018/0005053 A1* | 1/2018 | Browning | ............... | G01C 21/32 |
| 2018/0373980 A1* | 12/2018 | Huval | ............... | G06N 3/08 |
| 2019/0154823 A1* | 5/2019 | Insana | ............... | G01S 13/42 |
| 2019/0272433 A1* | 9/2019 | Yu | ............... | G06K 9/00805 |

OTHER PUBLICATIONS

Sabzevari et al., "Multi-body Motion estimation from Monocular Vehicle-Mounted Cameras", IEEE Transactions on Robotics, Jun. 2016, p. 638-651, vol. 32, np. 3.

* cited by examiner

METHOD OF IMAGE PROCESSING AND IMAGE PROCESSING DEVICE

TECHNICAL FIELD

Various aspects of this disclosure relate generally to a method of image processing and an image processing device.

BACKGROUND

Perception is an important component of Automatic Driving (AD) as well as for many real life applications and devices which need real time information about the occupation of a given space. Through perception, devices gain crucial information about empty spaces, occupied spaces and information about changes of the environment around the them. However, since the environment around devices may be very dynamic, it is essential for the perception process to be as fast and accurate as possible.

Image sensors, such as cameras, providing pictures of a given predetermined region may be an effective tool to detect features in the environment such as moving vehicles and obstacles. Also, pictures may be an effective tool to determine changes in the environment. But the extraction of relevant features to determine the changes tends to require a considerable amount of pictures and a considerable amount of time.

SUMMARY

A method of image processing is provided. The method may include: determining a candidate tuple from at least two images that are taken at different times, wherein the candidate tuples are determined using at least odometry sensor information. The couple of subsequent images have been detected by a moving image sensor moved by a vehicle. The odometry sensor information is detected by a sensor moved by the vehicle. The method may further include classifying the candidate tuples into a static tuple or a dynamic tuple. The static tuple represents a static object within the couple of subsequent images, and the dynamic tuple represents a moving object within the couple of subsequent images.

BRIEF DESCRIPTION OF THE DRAWINGS

In the drawings, like reference characters generally refer to the same parts throughout the different views. The drawings are not necessarily to scale; emphasis is instead generally being placed upon illustrating the principles of the disclosure. In the following description, various embodiments of the disclosure are described with reference to the following drawings, in which.

DESCRIPTION

Figure 1:
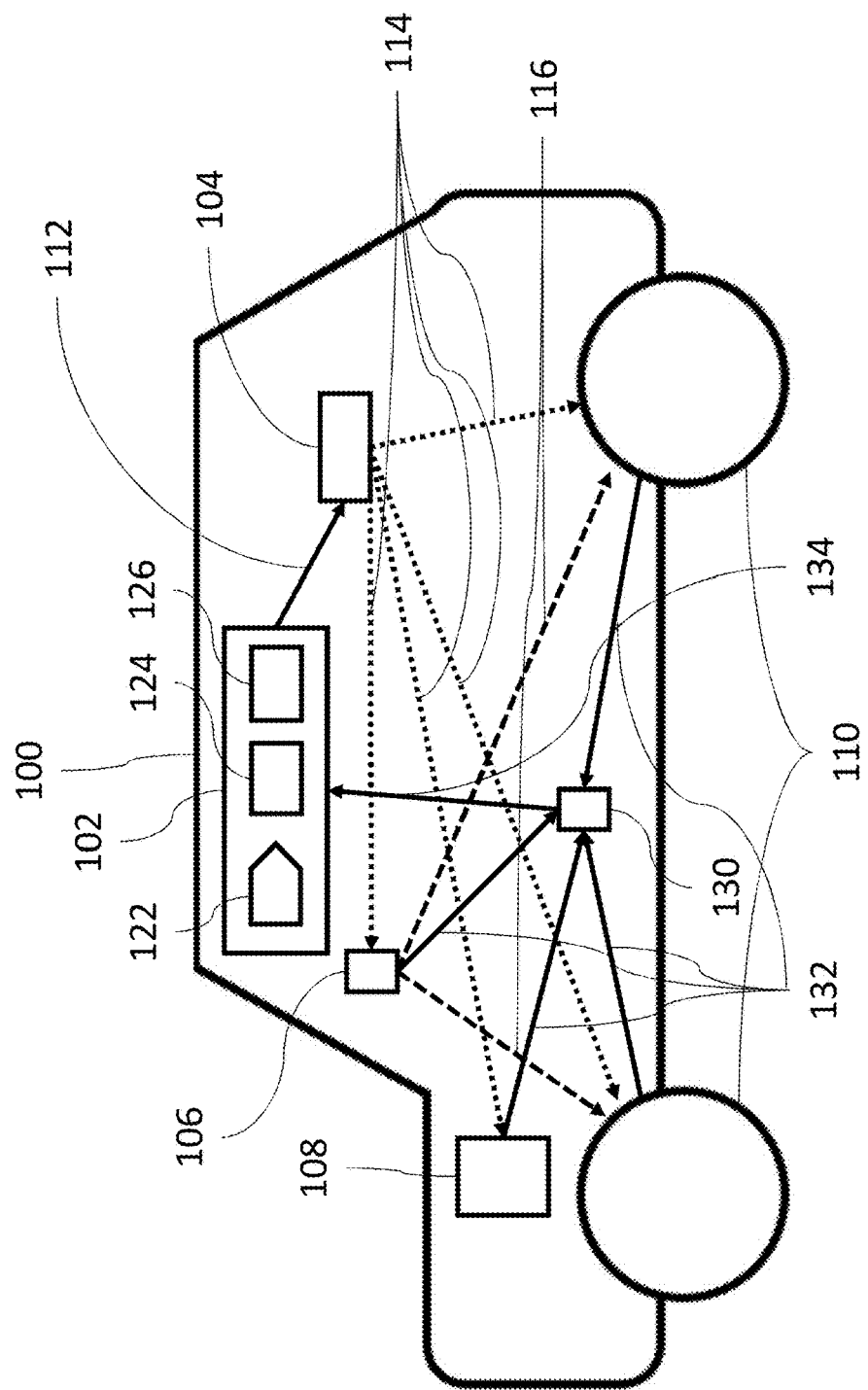
FIG. 1 shows an exemplary vehicle (e.g. an automatic vehicle) including a perception device, a controller, which may be configured to control the automatic vehicle driving direction and speed, and various automotive components such as a steering module, a motor, and wheels which may also include a braking system and a turning system.

The following detailed description refers to the accompanying drawings that show, by way of illustration, specific details and embodiments in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

Whereas the description and the figures refer to an Automatic Driving (AD) example involving at least one automatic vehicle, it should be understood that an object detecting device (which may also be referred to as object tracking device in the following) disclosed as well as the examples disclosed in general may be used in a wide range of devices including warning devices for vehicles which may not be employing any type of Automatic Driving or that may employ semi-Automatic Driving technologies. The object detecting device may also be used in drones, and in robots, such as delivery robots. In addition, the object detecting device may be used both in outdoor environments, and indoor. For example, the object detecting device may be utilized by vehicles in city streets or on highways, as well as by robots in indoor environments such as hallways, parking lots, and shopping malls.

Automatic Driving (AD), as well as many other real life applications and devices, requires a detailed knowledge of the environment in which the automatic driving vehicle operates. Therefore, perception is an important component of Automatic Driving (AD) as well as for many real life applications and devices which need real time information about the occupation of a given space.

Through perception, automatic driving vehicles and other devices gain information about empty spaces, occupied spaces and information on changes of their environment. However, since the environment around devices may be very dynamic, it is desired for the perception process to be as fast and accurate as possible.

To perceive the characteristics of their environment, automatic driving vehicles require a multiplicity of sensors to identify the objects present in the environment of the vehicle. One type of such a sensor is an image sensor taking pictures of the environment around the automatic driving vehicle. An example of such an image sensor is a camera such as a Bellow mono optical camera. Some automatic vehicles may require at least one image sensor; in some exemplary cases, automatic vehicles may require a plurality of image sensors.

Image sensors on automatic vehicles may be used to acquire information about both static and dynamic objects simultaneously in very efficient manner. Static objects are objects in the environment that do not move. Examples of static objects include buildings, houses, traffic signals, traffic lights, street furniture such as street poles, bus stops, benches, and parked vehicles. Dynamic objects are objects that move such as different types of vehicles including cars, trucks, busses, trams, and bicycles, but dynamic objects may also include pedestrians, and they may also include different types of automatic vehicles including self-driving vehicles, delivery robots, and drones.

Because automatic driving vehicles need to react quickly to changes in their environment, it is essential to optimize the perception of the environment since good perception can help in the motion planning and control layer. Optimizing the perception of the environment may mean striking a better trade-off between the processing time required by the perception process and the perception precision; whereby, the ideal improvement may reduce the processing time required by the perception process, while improving the perception precision.

A different dimension of optimization emerges from the need to use multiple sensors and possibly multiple image sensors which may result in heterogeneous and redundant information. In principle, the extra information obtained by different sensors may be used to improve the perception through a reduction of error. Such error reduction can be achieved with an effective mechanism of information fusion, such as Multibody Structure Information Fusion (MBSIF) which gives possibility to get the structure for moving and static objects simultaneously.

An image sensor will have to enable to capture of the dynamicity of the environment. Such dynamicity may come from both the movements of the image sensor with respect to the environment, as well as from the movements of other objects, devices and vehicles in the environment with respect to the image sensor. Furthermore, such changes may be quite fast; for example, a vehicle moving at 100 km/h on a highway may change position of about one meter in a typical time frame interval between two pictures. If movement is to be detected by comparing sequences of multiple pictures which require up to 7 or 8 pictures, across 7 or 8 time frames the vehicle may have moved a considerable distance. In such cases, the perception process may have been too long, and it may therefore be impossible to take any corrective action. To reduce this delay, the movement detection algorithms 1P and 2P proposed in this disclosure may require only two pictures in two sequential time frames. As a consequence, only one-time span across the two time frames may be required to distinguish static objects from dynamic objects, and to predict the direction of motion of dynamic objects. The net result may be a reduction of the processing time with an improvement of the accuracy of the information gathered.

FIG. 1 shows an exemplary vehicle (e.g. an automatic vehicle) 100 including a perception device 102, a controller 104, which may be configured to control the automatic vehicle driving direction and speed, and various automotive components such as a steering module 106, a motor 108, and wheels 110 which may also include a braking system and a turning system (not displayed).

It should be noted that the automatic driving vehicle 100 may include various other components which are not described in detail. Furthermore, the automatic vehicle 100 may be an automatic driving car, an automatic drone, an automatic plane or other flying object, an automatic bike, trike, or the like. As an alternative, the automatic vehicle 100 may be any kind of robot or moveable hardware agent. Furthermore, it is to be noted that the vehicle 100 does not necessarily need to be an automatic vehicle, but can also be a partially automatic vehicle. Furthermore, the disclosure below may be relevant for any device requiring to detect static and dynamic objects in a given area, such as surveillance devices which may monitor a specific location. As opposed to vehicles that constantly change position, such devices may be fixed in a specific position.

The exemplary perception device 102 may be configured to perceive the environment to determine the area(s) that may be occupied by at least one static object, such as an obstacle on the road, as well as areas that may be occupied by at least one dynamic object such a moving vehicle, and area(s) that may be free of any object. In turn, the object detecting device may identify the shape of the objects on the road and, if the objects move, their direction of motion, and predict their positions and, in turn, which cells are free and which ones are occupied.

The perception device may include at least one object detecting device 122 and it may also include at least one other sensory device 124 configured to operate sensors such as lidars and radars; and a communication device 126 configured to communicate with other vehicles on the road, or road infrastructure, or other devices that may have knowledge of the status of the road.

FIG. 1 also shows an exemplary connection scheme across the different components. Such communication connections realizing the connection scheme may be implemented as a wired connection or a wireless connection. Any kind of communication protocol may be used for a communication between two respective components. Furthermore, the interaction between the components may be implemented as a remote function call or an API call across software modules.

The connection 112 between the perception device 102 and the controller 104 may be configured to provide an exemplary information flow by means of which the perception device 102 provides e.g. the position of free and occupied spaces close to the automatic vehicle (e.g. automatic vehicle) 100 to the controller 104. Information about occupied spaces may include the position of other vehicles and how their position may change in the (near and/or remote) future.

Each one of the connections 114 couples the controller 104 with the other components, such as the steering module 106, the motor 108, and the wheels 110, and the like. The connections 114 may be configured to provide information flow from the various automotive components: e.g. the steering module 106, the motor 108, and the wheels 110 to the controller 104.

The steering module 106 may communicate, through connections 116, to a turning system (not shown) of the wheels 110 to change a wheel angle with respect to the direction of the automatic vehicle 100 forcing the automatic vehicle 100 to change direction. In an implementation of the automatic driving vehicle 100, the steering module 106 may be configured to mechanically change the angle of a respective wheel 110 with respect to the direction of the automatic vehicle 100 forcing the automatic vehicle 100 to change direction. Alternatively, the steering module 106 may be a component of a wheel's control system (not shown).

In FIG. 1, reference numeral 130 indicates an exemplary odometry sensor which collects information from the engine 108, the wheels 110, and the steering module 106 through the links 132. In addition, the odometry sensor 130 may use other sources of information not shown in FIG. 1 including outdoor positioning systems, including the Global Position System (GPS), GALILEO, and the like, and indoor positions systems. The odometry sensor illustratively provides motion information to the perception device 102. Such motion information may include one or more of speed, acceleration, and/or angle of motion of the vehicle 100.

Figure 2:
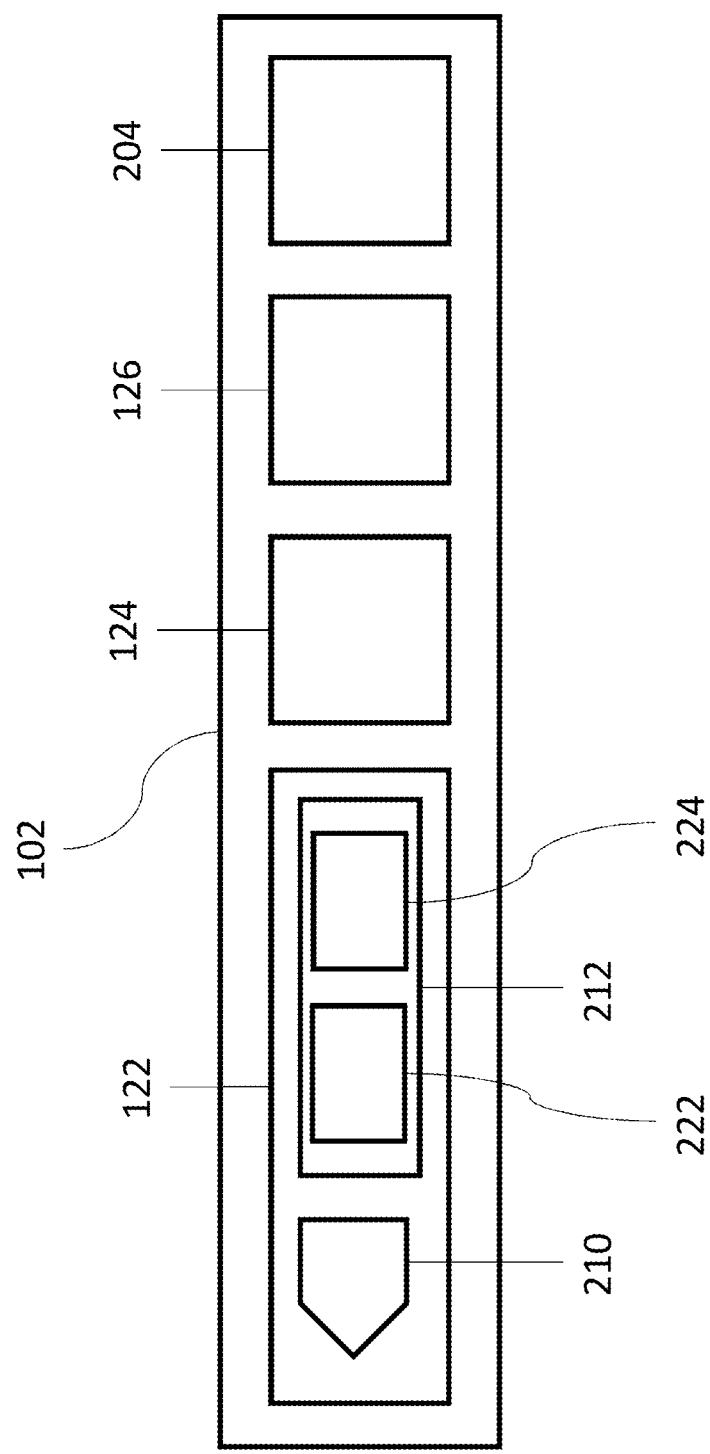
FIG. 2 shows an exemplary perception device that may be configured to perceive the environment in a predetermined region to detect area(s) that may be occupied by at least one static object, such as an obstacle on the road, as well as areas that may be occupied by at least one dynamic object such a moving vehicle, and area(s) that may be free of any object.

FIG. 2 shows an exemplary perception device 102 that may be configured to perceive the environment in a predetermined region to detect area(s) that may be occupied by at least one static object, such as an obstacle on the road, as well as areas that may be occupied by at least one dynamic object such a moving vehicle, and area(s) that may be free of any object. The perception device may identify the shape of the objects on the road and, if the objects move, their direction of motion, and predict their positions and, in turn, which cells are free and which ones are occupied.

The predetermined region of the perception device may be predetermined in a number of different ways. It may be a region which may be predetermined functionally, for example the predetermined region may be 50 meters around a moving vehicle; or it may be predetermined to meet some specific requirements. By way of example, at slow speeds, the predetermined region may be a circle around a vehicle. At faster speeds, it may extend in the forward direction becoming oval shaped and monitoring a large area in front of the vehicle, and a smaller area behind the vehicle. In general, the environment of the vehicle will be detected by the sensors mounted on or in the vehicle or by means of information received from other entities such as other vehicle or infrastructure entities e.g. via radio signal transmission, e.g. using vehicle to vehicle (V2V) communication, vehicle to infrastructure (V2I) communication, vehicle to anything (V2X) communication or the like. Any other suitable communication technology may be used in this context.

The perception device 102 may include at least one object detecting device 122, and it may also include at least one other sensory device 124. The sensory devices may be configured to sense objects in the predetermined region through sensors such as lidars and radars. In addition to sensors, the perception device may include one or more computing components (not shown) to process the sensed information and one or more components to communicate with other components of the perception device 102 or to communicate with other components of the whole vehicle 100.

In addition, the perception device 102 may include at least one communication device 126 configured to communicate with other vehicles and objects also observing the predetermined region. Such communication may include communication with other vehicles, through Vehicle to Vehicle (V2V) protocols; it may also include communication with the road infrastructure, such as traffic lights, signals, barriers among others, through Vehicle to Infrastructure (V2I) protocols; it may also include communication with any other object or device that may provide information through Vehicle to Anything (V2X) protocols. Such communication may also extend to communication performed through other types of networks and protocols including mobile networks and satellite communication. Such communication may include communications with mapping services providing up-to-date road information, or communication with services monitoring road conditions in a wider area around the vehicle. In addition to communication apparatuses, the perception device may include one or more computing apparatus (not shown) to process the information received through communication and one or more apparatuses to communicate with other components of the perception device 102 or to communicate with other components of the whole vehicle 100.

The perception device 102 may also include a computing device 204 configured to perform the fusion of the information gathered by object detecting device 122, by the sensory device 124, and by the communication device 126. In some exemplary implementations the fusion of the sensory information may be based on Multibody Structure Information Fusion (MBSIF).

In some exemplary implementations of a perception device, the computing device 204 is not present. Rather its functions may be transferred (in other words taken over) to other components of the perception device 102 which, while communicating with one another in a Peer to Peer (P2P) fashion, may share sensory information and perform information fusion. In other exemplary implementations, the information fusion task may be accomplished by the controller 104 or by other components of the vehicle 100.

In other implementations, the computing device 204 may also be a virtualized device which is executed by at least one physical device. In addition, the computing devices 204 may be a network device residing in a cloud. In some implementations, the computing device 204 may be configured to operate within a combination of P2P, virtualization, cloud-based or native components within vehicle 100.

The exemplary object detecting device 122 may include at least one image sensor 210 and one or more computing devices 212 configured to process the information provided by the image sensors 210 producing a map of tracked objects.

Each one of the computing devices 212 may in include a processor 222 and a memory 224 to store information about the tracked objects.

The processor 222 may be configured to compute the processes described by the 1P and 2P algorithms generating occupancy information of the tracked objects that may be detected in the predetermined region. In addition, the processors 222 may dynamically update the occupancy information of the tracked objects, thereby successively generating a plurality of updated maps of the predetermined region with occupancy information.

The memory 224 may be configured to store the generated occupancy maps of the predetermined region.

The computing device 212 may include a plurality of processors and/or one or a plurality of controllers. A processor or a controller may thus be or include an analogue circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The computing device 212 may also be a virtualized device which is executed by at least one physical device. In addition, the computing devices 204 may be a network device residing in a cloud. In some implementations, the computing device 204 may be configured to operate within a combination of P2P, virtualization, cloud-based or native within the vehicle 100.

Figure 3:
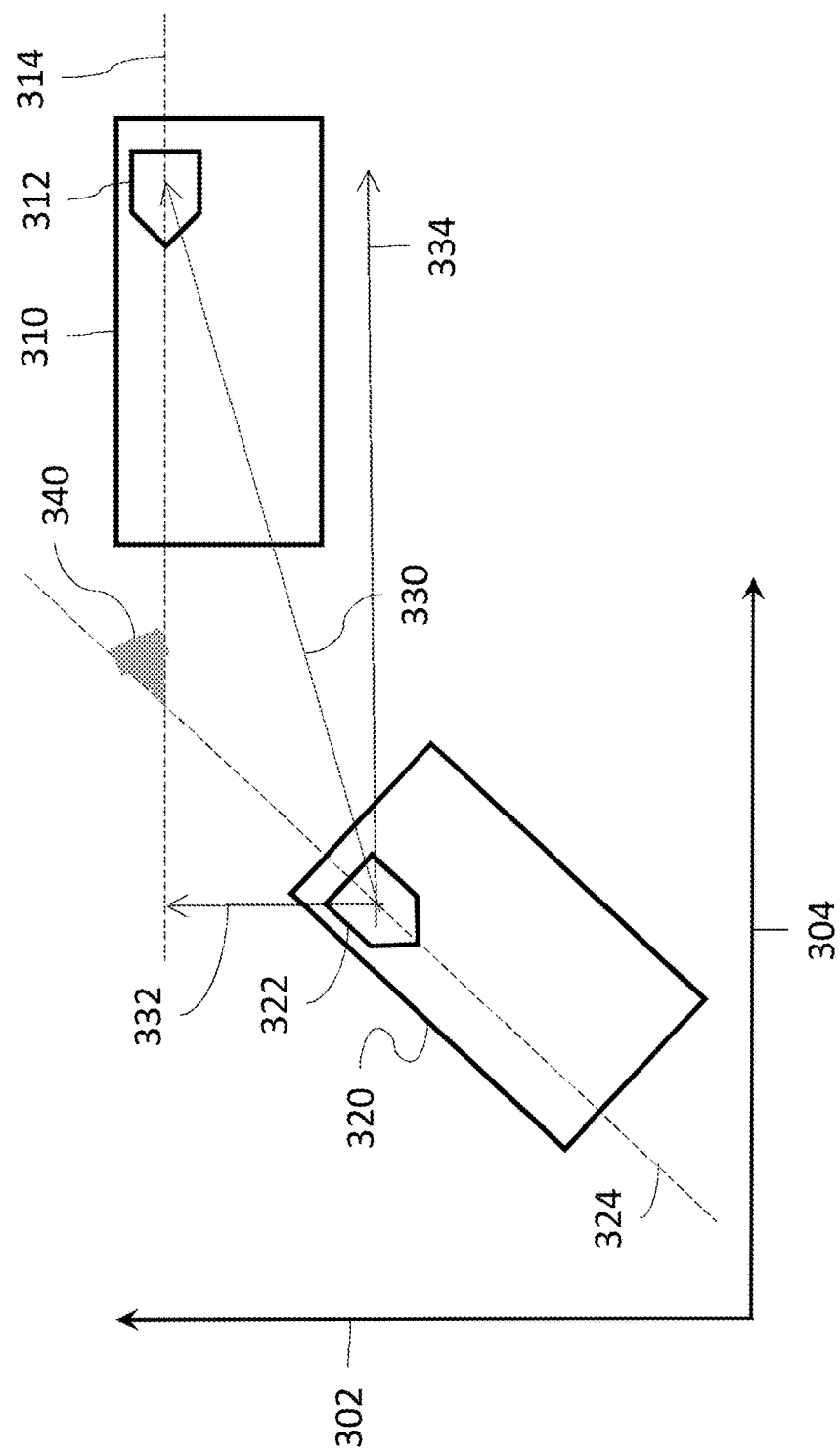
FIG. 3 shows an exemplary motion model for a 1P algorithm used for the segmentation of static and dynamic objects.

FIG. 3 shows an exemplary a motion model for 1P algorithm used for the segmentation of static and dynamic objects.

In FIG. 3, the lines 302 and 304 represent illustrative reference axis, where 302 represents the Y axis, while 304 represents the X axis. The rectangle 320 illustratively represents the position of the vehicle 100 at a given time frame 1; the sign 322 represents the image sensor attached to the vehicle 100; the line 324 shows the direction of motion of vehicle 100 at time frame 1. The rectangle 310 illustratively represents the position of vehicle 100 at a given time frame 2; the sign 312 represents the image sensor attached to the vehicle 100; the line 314 shows the direction of motion of the vehicle 100 at time frame 2.

Reference numeral 340 represents the angle of vehicle rotation in the world coordinates between the two positions 320 and 310. The vehicle odometry may provide a correct value for this angle.

Line 330 represents the distance traveled by the vehicle when moving from the first position 320 to the second position 310. Such distance may be computed with respect to the position of the image sensor.

The two lines 332 and 334 represent the projections of the line 330 along the reference axis 302 and 304. Specifically, 334 is the projection of the line 330 along the X axis 304, indicating the translation, in other words the movement, of the vehicle 100 along the X axis 304; 332 is the projection of the line 330 along the Y axis, indicating the translation, in other words the movement, of the vehicle 100 along the Y axis 302.

An analytic constraint of the estimation of motion of the vehicle can be provided using a 1P algorithm which is a derivative of the Structure from Motion (SFM) algorithm.

The 1P algorithm, as well as the SMF algorithm, addresses the problem of simultaneous estimation of a vehicle motion, also called ego motion, and the motions of multiple moving objects in the predetermined region, also called eoru motions, through pictures taken by a vehicle mounted image sensor.

With respect to FIG. 3, the ego motion is represented by the translation of vehicle 100 from its initial position 320 to a following position 310. Furthermore, the vehicle 100 may be referred as the ego vehicle.

The SFM algorithms typically require at least 7 pictures, for a total time length of at least six times the time span between two time frames, to estimate the fundamental matrix required to estimate the ego motion of a vehicle. In contrast, the 1P algorithm may require only two pictures and one-time span between two time frames, to estimate the fundamental matrix required to estimate the ego motion of a vehicle. The 1P algorithm achieve this result because it assumes that the vehicle coordinate system may be co-located with the coordinates of the image sensor and that the vehicle odometry information may give an estimation of the vehicle motion; and that the image sensor location in the vehicle is known. Furthermore, the 1P algorithm may assume that image sensor orientation is not so important, since it is always possible to unwrap the image in any rotated direction. Accordingly, it can be assumed that the image sensor is aimed across the car. Finally, the 1P algorithm may assume that the ego vehicle may be moving in a flat surface. The non-limiting assumption of a flat surface is to be intended as "locally flat" in the sense that the surface on which the ego vehicle moves in the time interval that spans between the two time frames of two subsequent pictures is assumed to be flat.

In a first process of the 1P algorithm, two temporally subsequent pictures are compared to determine equivalent features in the two pictures to estimate the objects motion from the pictures. Exemplary methods to be used to detect equivalent features may include a block-matching algorithm, a phase correlation and/or one or a plurality of frequency domain methods, one or a plurality of pixel recursive algorithms, an optical flow, a corner detection, in addition to filtering algorithms such as random sample consensus (RANSAC) and Multiple random sample consensus (MultiRANSAC).

The result of this first process may be the determination of a set of candidate tuples where each tuple may indicate two equivalent features in the two subsequent pictures. Illustratively, a candidate tuple may contain the position of a feature in the picture taken in the first time frame, and the position of the equivalent feature in a picture taken at a second subsequent time frame.

In the second process of the 1P algorithm, under the fundamental matrix constraint:

$$Y_1*(T_{cameraX}*\cos(\theta)-T_{cameraY}*\sin(\theta))-Y_2*(T_{cameraY}+T_{cameraX}*X_1)+Y_1*X_2*(T_{cameraX}*\cos(\theta)+T_{cameraY}*\sin(\theta))=0 \quad (1)$$

wherein $X_1, Y_1$ are the coordinates of a feature in a candidate tuple at time frame 1;

$X_2, Y_2$ are the coordinates of an equivalent feature in a candidate tuple at time frame 2;

$T_{cameraX}, T_{cameraY}$ are the image sensor translations along the axes as shown by the lines 334 and 332 respectively.

Equation (1) could be simplified to obtain a quadratic expression for sin(0).

By solving equation (1) with respect to θ it is possible to derive an estimate of the angle 340. Illustratively, since this angle is known from the odometry as well, it becomes now possible to cluster the static point couples and the dynamic point couples rather easy and fast.

Since the SFM fundamental matrix (1) provides a relation between the movements of the ego vehicle and the different position of the eoru objects and vehicles in the two sequential pictures; and since the correct value of the angle 340 may be known given the vehicle odometry which records all movements of the vehicle; to derive whether an object is static of dynamic, the estimates θ provided by the SFM algorithm may be compared with the correct value of the angle 340.

When the difference between the estimated θ and the correct value of the angle 340 is small, then there is an indication that the corresponding object is a static object. Where the determination of whether the difference of the two values is small may be made by verifying whether the estimated θ is included in a given interval determined by a threshold, or computed through the standard deviations from the mean of a distribution of the estimations of the angle 340.

When instead the difference between the estimated θ and the correct value of the angle 340 is larger than the prescribed interval then the corresponding data may be considered an outlier possibly indicating that it was taken from a dynamic object.

Therefore, with the analytical formula (1) with a single couple of subsequent images, it may be possible to segment the motion of candidate tuples that are static and the rest candidate tuples, whereby the rest of the candidate tuples are non-static candidate tuples possibly indicating either erroneous candidate tuples or moving, i.e. dynamic, objects. In more detail, without limiting character, it is assumed in the formula (1) that the scene is flat. This is in most of the cases a good assumption. As soon as this assumption is valid formula (1) can be formulated. It provides the possibility to cluster static and dynamic 3D point couples in very efficient manner. It is fast because it is very easy formula. It is precise because there is no need to use Eppipolar Geometry constraint which has five degrees of freedom. Furthermore, in formula (1), a single couple is enough to obtain the angle. This means that an angle can be obtained for each individual angle.

Figure 4:
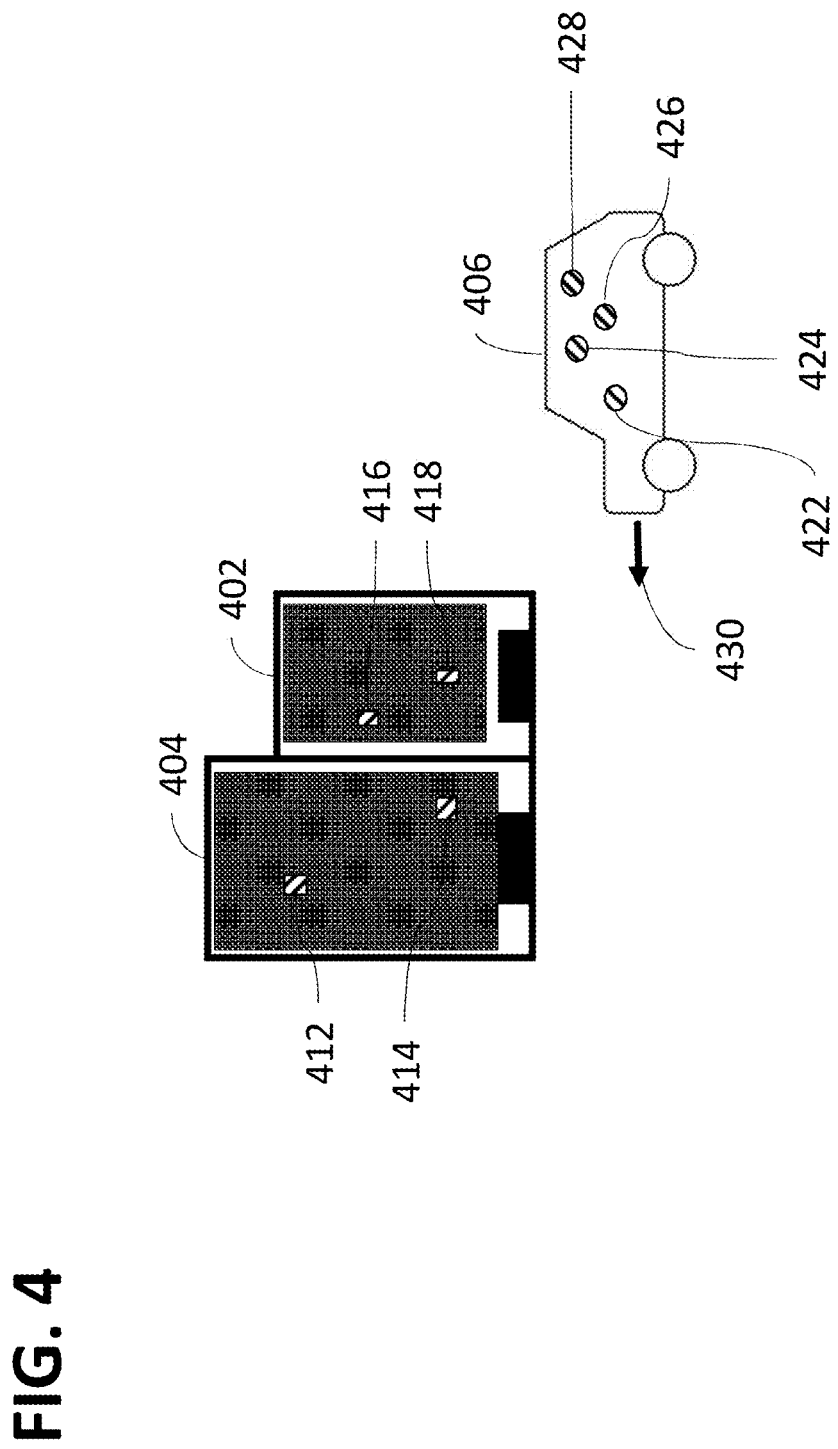
FIG. 4 shows an exemplary result of motion segmentation resulting from the use of the 1P algorithm.

FIG. 4 shows an exemplary result of motion segmentation resulting from the use of the 1P algorithm.

In FIG. 4 the two objects 402 and 404 represent exemplary buildings, while the object 406 represents an exemplary moving vehicle. The object 406 is associated with an exemplary direction of motion shown by the arrow 430.

The rectangular signs 412, 414, 416, and 418 are illustrative candidate tuples that may be associated with static objects, while the round signs 422, 424, 426, and 428 are illustrative candidate tuples that may be associated with non-static objects such as the vehicle 406.

Upon detecting the direction of motion of the candidate tuples 412, 414, 416, 418, 422, 424, 426, and 428 the motion of the corresponding objects may be calculated by clustering candidate tuples that have similar motion characteristics. Such clustering could be computed through clustering algorithms such as k-means or hierarchical clustering. Upon clustering, the features of the objects motion may be computed with probabilistic methods such as mean. As soon the individual couples are classified, the clustering can be used based on neighbourhood and motion angle to create the object candidates.

Therefore, the exemplary result of motion segmentation resulting from the use of the 1P algorithm as shown in FIG. 4 may detect the building 404 and 402 as static objects, while the vehicle 406 as a non-static object.

The 1P algorithm may distinguish the static objects from other objects and therefore it may give a good indication of the dynamic objects in the predetermined region. But it may not provide any indication of the direction of motion of dynamic objects.

The 2P algorithm may provide an indication of the motion segmentation of the Moving Objects whereby the moving objects are segmented on the bases of their direction of motion. In the general case, when both vehicle 100 as well as dynamic objects in the predetermined region are moving, the overall motion recorded by the image sensor will be the sum of the motion of vehicle 100 and the motion of the vehicles in the predetermined region. Therefore, the motion in case of dynamic objects is modelled differently than in case of 1P algorithm.

The first process of the 2P algorithm is to remove the static candidate tuples detected by the 1P algorithm in conjunction with odometry information. The remaining candidate tuples are then only dynamic candidate tuples.

Figure 5:
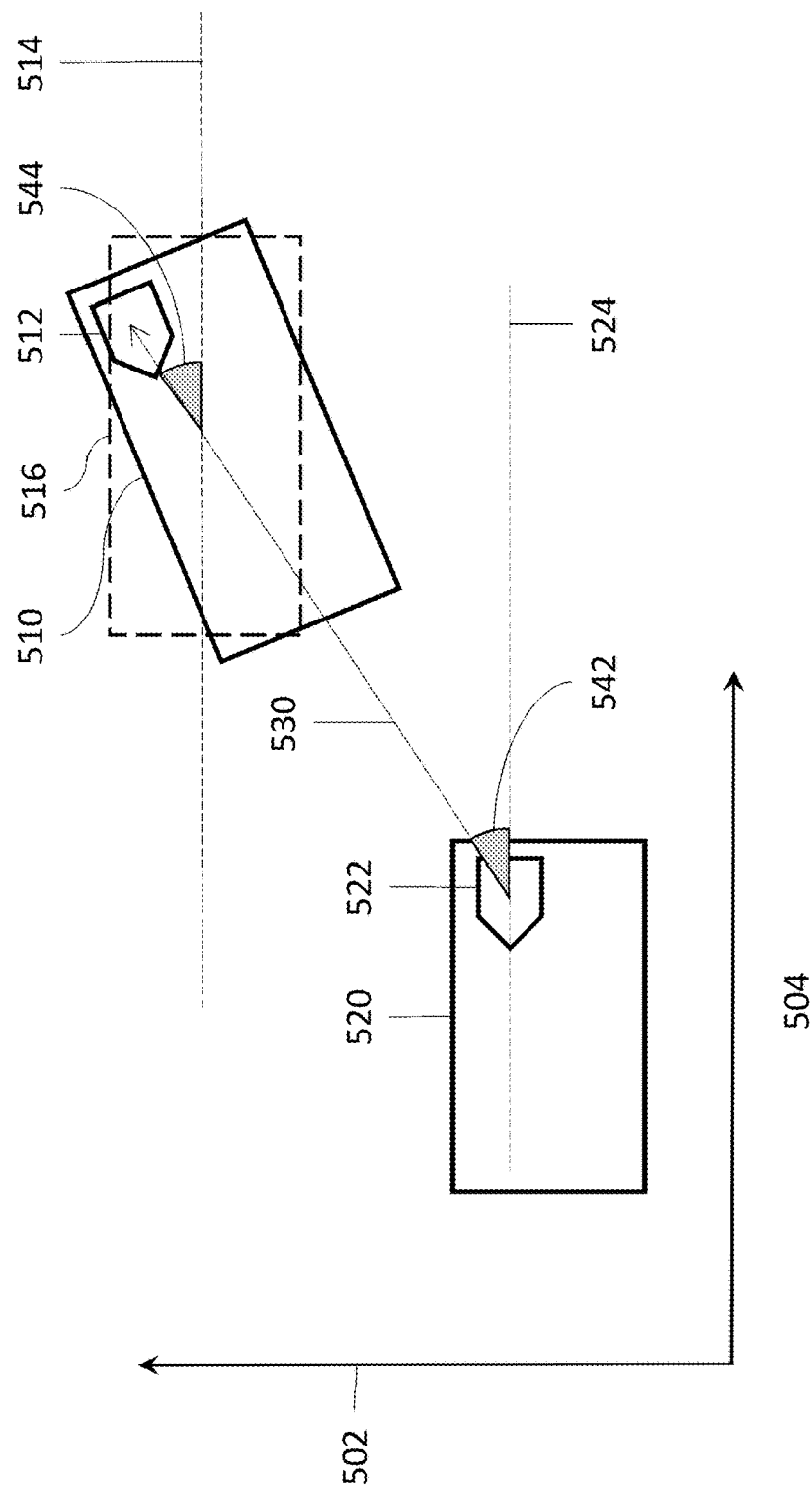
FIG. 5 shows an exemplary motion model for a 2P algorithm used for the segmentation of dynamic objects moving in different directions.

FIG. 5 shows an exemplary a motion model for the 2P algorithm used for the segmentation of dynamic objects moving in different directions.

In FIG. 5, the lines 502 and 504 represent illustrative reference axes, where 502 represents the Y axis, while 504 represents the X axis.

The rectangle 520 represents the position of vehicle 100 at a given time frame 1, the sign 522 represents the image sensor attached to the vehicle 100 at time frame 1, and the line 524 shows the direction of motion of vehicle 100 at time frame 1.

The rectangle 510 illustratively represents the position of vehicle 100 at a given time frame 2, the sign 512 represents the position of the image sensor attached to the vehicle 100 at time frame 2, the dotted rectangle 516 represents the projected orientation of the vehicle 100 if it had not changed. Line 514 shows a projection of line 524 to the position of vehicle 100 at time frame 2.

Line 530 represents the distance traveled by the vehicle when moving from the first position 520 in time frame 1 to the second position 510 in time frame 2. Such distance is computed with respect to the position of the image sensor in the first time frame 522, and the position of the image sensor in the second time frame 512.

Reference number 542 illustratively the direction along which the vehicle moved (it thus rather represents translation).

Reference number 544 represents the angle between line 514 and line 530. In other words, the angle of movement of the vehicle with respect to projected direction from frame 1. Illustratively, reference number 544 represents the angle of vehicle rotation in the world coordinates.

Angle 542 can be illustratively named and angle 544 can be illustratively named $\varphi$.

An estimate of the angles $\vartheta$ and $\varphi$ performed by the 2P algorithm is based on the following equations.

Translation vector of the object motion is given with the angle $\varphi$. Therefore, an equation for a translation vector T results in:

$$T = \begin{bmatrix} \sin(\varphi) \\ \cos(\varphi) \\ 0 \end{bmatrix} \quad (2)$$

A Fundamental matrix constraint which is used as the bases is defined only with the scaling factor, therefore equation (2) is given only as unit vector.

A rotation can be expressed as:

$$R = \begin{bmatrix} \cos(\vartheta) & \sin(\vartheta) & 0 \\ -\sin(\vartheta) & \cos(\vartheta) & 0 \\ 0 & 0 & 1 \end{bmatrix} \quad (3)$$

An essential matrix may be calculated based on (2) and (3) as $$E = T \times R = \begin{bmatrix} 0 & -\cos(\vartheta) & 0 \\ \cos(\varphi - \vartheta) & 0 & \sin(\varphi - \vartheta) \\ 0 & \sin(\vartheta) & 0 \end{bmatrix} \quad (4)$$

Rewriting (4) as fundamental matrix constraint results in the following expression:

$$f(\vartheta,\varphi)=X_2Y_1\cos(\varphi-\vartheta)-X_1Y_2\cos(\vartheta)+\sin(\vartheta)+Y_1\sin(\varphi-\vartheta)=0 \quad (5)$$

Where the coordinates $X_1$ and $X_2$ are known while $\varphi$ and $\vartheta$ we are two variables that we want to estimate.

If we introduce the notations $a_1=\cos(\varphi-\vartheta)$, $a_2=\cos(\vartheta)$, $a_3=\sin(\vartheta)$, $a_4=\sin(\varphi-\vartheta)$ we can write (5) in linear form:

$$[a1, a2, a3, a4] * \begin{bmatrix} X_2Y_1 \\ -X_1Y_2 \\ 1 \\ Y_1 \end{bmatrix} = 0 \quad (6)$$

When candidate tuples indicate equivalent features in more than two pictures more, equation (6) can be solved by a so-called factorization method, such as a Singular Vector Decomposition (SVD), In case candidate tuples indicate equivalent features in only two pictures a linearization in accordance with equation (7) is possible.

$$f(\theta, \varphi) = f(\theta_0, \varphi_0) + J(\theta_0, \varphi_0) \begin{bmatrix} \vartheta - \theta_0 \\ \varphi - \varphi_0 \end{bmatrix} \quad (7)$$

Where $J(\theta_0,\varphi_0)$ is the Jacobean Matrix.

$$J(\theta, \varphi) = \begin{bmatrix} -X_2Y_1\sin(\varphi-\vartheta) + X_1Y_2\sin(\vartheta) + \cos(\vartheta) - Y_1\cos(\varphi-\vartheta) \\ -X_2Y_1\sin(\varphi-\vartheta) + Y_1\cos(\varphi-\vartheta) \end{bmatrix} \quad (8)$$

Figure 6:
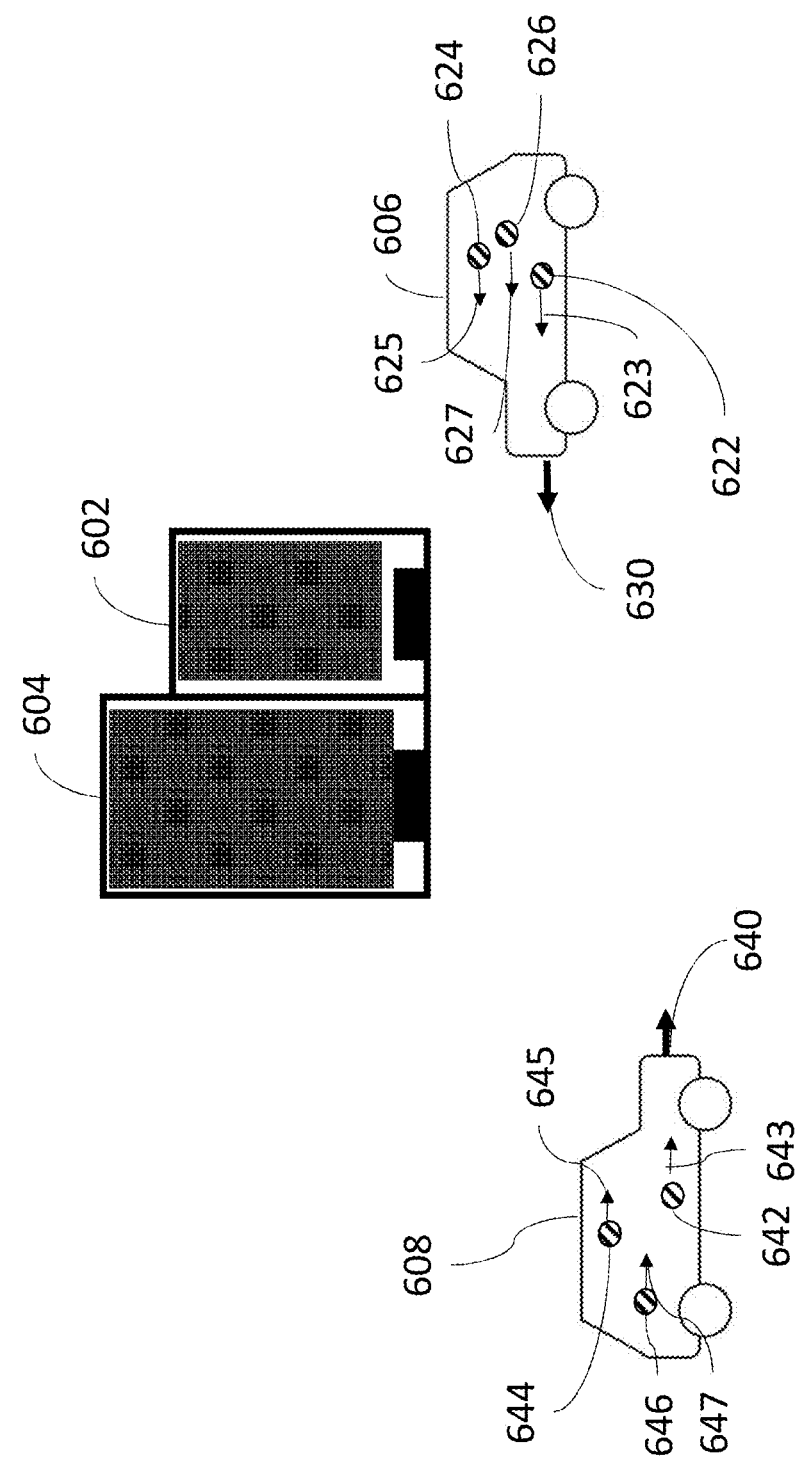
FIG. 6 shows the results of the 2P algorithm in a predetermined region where there are both static and dynamic objects.

FIG. 6 shows an exemplary result of the 2P algorithm in a predetermined region where there are both static and dynamic objects. The exemplary result of the 2P algorithm segments the dynamic candidate tuples corresponding to the two exemplary vehicles 606 and 608, identifying their direction of motion.

In FIG. 6, the two objects 602 and 604 represent exemplary buildings, and two objects 606 and 608 which represents exemplary vehicles driving in different directions. The vehicle 606 is associated with exemplary direction of motion 630; similarly, the vehicle 608 is associated with an exemplary direction of motion 640.

Since the 2P algorithm filters out all candidate tuples related to the static objects, no candidate tuples are shown in relation to the two static objects 604 and 602.

Reference numerals 622, 624, 626, 642, 644, and 646, which have a round shape may indicate candidate tuples detected on dynamic objects. The signs 623, 625, 627, 643, 645, and 647 are arrows that may indicate the direction of motion associated to the candidate tuples.

The exemplary result of the 2P algorithm shows that the candidate tuples have been segmented so that the direction of motion of the two vehicles are detected. Specifically, they show that vehicle 606 is moving in the opposite direction than vehicle 608.

When used in the context of automatic vehicles or other devices the two algorithms 1P and 2P provide information about the predetermined region. But in general, automatic vehicles have a plurality of sensors on board. In addition, they see each other and they share the information with the standards like V2V, V2X, V2I. All this perception information may be provided to the motion planning and control modules that may steer the vehicle or to other actuator modules.

If automated driving the vehicles behave like rational agents, the situation may be similar to playing chess when each participant has to calculate the several moves in advance to achieve the final destination.

The crucial stumbling block is the fusion of very different information ranging from communicated information to sensed information which is sensed in different ways with different levels of reliability. Such information fusion may be performed with Multi-body Structure Information Fusion (MBSIF) in the mutual perception of the road participants. MBSIF algorithm gives the possibility to obtain the direction of each road participant with the single image sensor.

Illustratively, performing the methods described herein, information is obtained about how dynamic objects are moving (rotation angle and direction of movement). This information will then be used in AD as redundant info in the perception.

Figure 7:
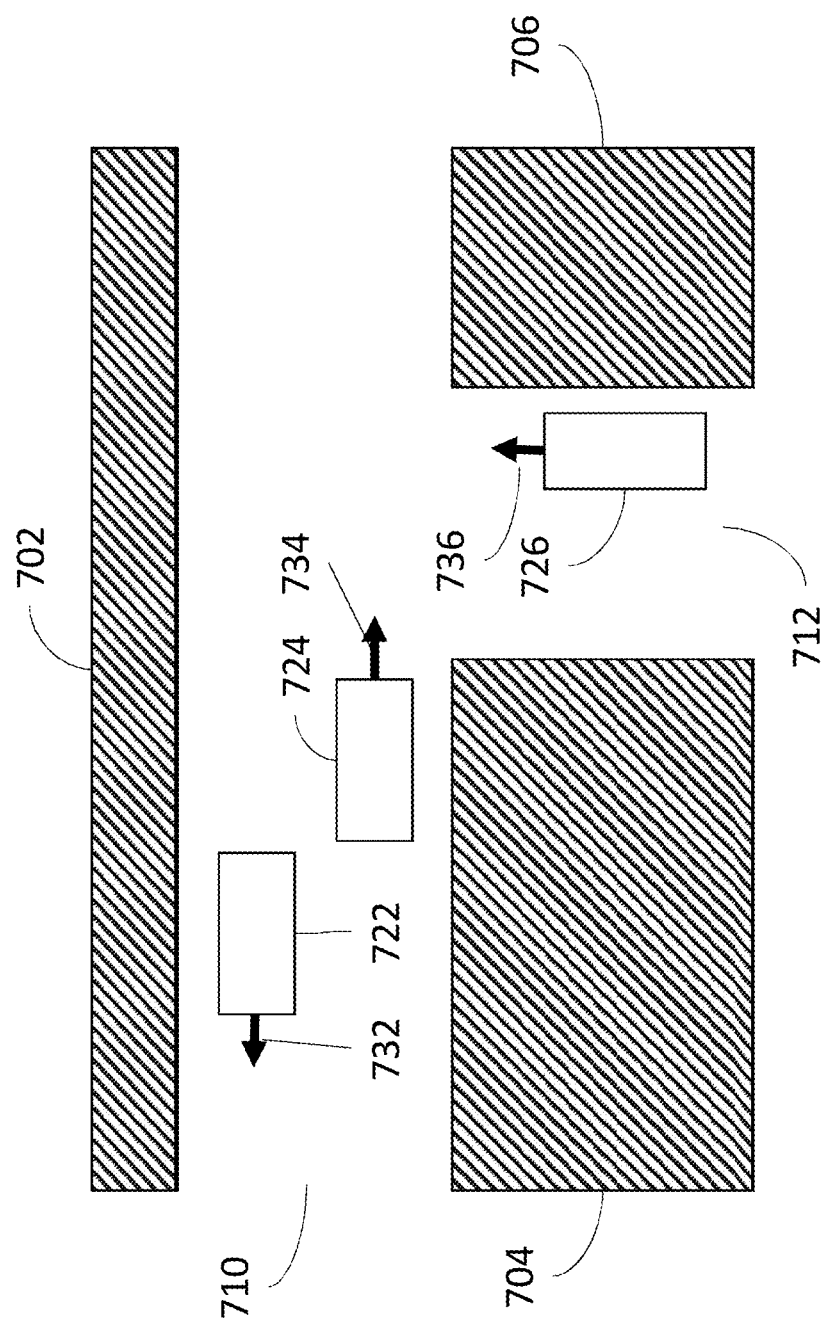
FIG. 7 shows an exemplary situation in which the perception of vehicles is improved through the use of information fusion.

FIG. 7 shows an exemplary situation whereby the perception of vehicles is improved through the use of information fusion. In FIG. 7, the areas 702, 704 and 706 indicate static objects such as buildings, while the empty spaces illustratively indicated by reference numerals 710 and 712 may indicate empty spaces between the building such as streets.

In the exemplary situation shown in FIG. 7, the vehicle 726 is associated with an exemplary direction of motion 736. Vehicle 726 is approaching an exemplary intersection between street 710 and 712, with incoming traffic in both directions on street 710.

In FIG. 7 the traffic is illustratively presented by the sign 722, which represents an exemplary vehicle travelling in the direction indicated by the arrow 732, and sign 724, which also represents an exemplary vehicle travelling in the direction indicated by the arrow 734.

Before entering the street 710, vehicle 726 needs to sense the traffic and locate vehicles in the street 710, and specifically the two vehicles 722 and 724; furthermore, vehicle 726 needs to detect the direction of motion of the two vehicles 722 and 724.

Figure 8:
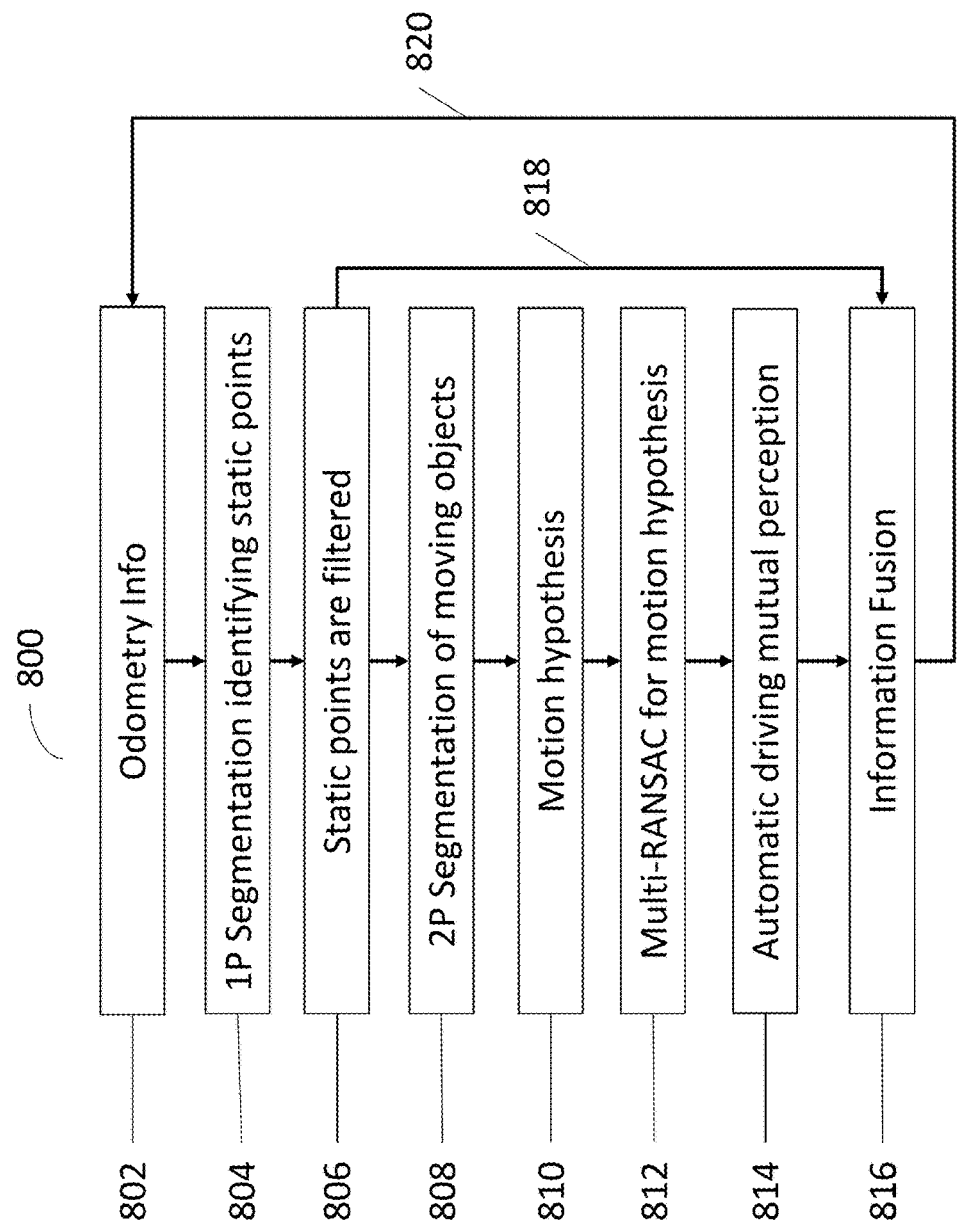
FIG. 8 shows a flow diagram illustrating the algorithmic chain of the object detecting device.

Vehicle 726 may obtain information about the position of vehicles 722 and 724 as well their direction of motion through the MBSIF algorithm by fusing information obtained through V2V communication and perception information gathered through the many sensors. Final results of the perception and localization of objects on the HD map is improved FIG. 8 shows a flow diagram 800 illustrating the algorithmic chain of the object detecting device 102.

In 802, odometry information is used to gather information about the vehicle motion.

In 804, the 1P algorithm may be used to segment static candidate tuples indicating static objects in the predetermined region, from non-static candidate tuples possibly indicating dynamic candidate tuples.

In 806, the static candidate tuples are filtered from the rest of the candidate tuples. The filtered candidate tuples may be then provided to the information fusion process in 816.

In 808, the 2P algorithm is used to segment dynamic candidate tuples identifying moving objects, such as vehicles on the street.

In 810, the information provided by the 2P algorithm is used to formulate a hypothesis on the dynamic objects direction of motion.

In 812, the hypotheses formulated in process 810 are evaluated with Multiple Random Sample Consensus (Multi-RANSAC) approach.

In 814, the Mutual perception information gathered through communication such as V2V, V2I and V2X as well as other forms of communication is collected.

In 816, the information about static objects, which may be transferred through link 818, information about the motion of dynamic objects, scaled with an appropriate scaling factor, are fused with information gathered though communication and other information available to the Automatic Driving infrastructure.

In various aspects of this disclosure, filter may be provided which use GPS odometry and visual odometry information. As soon as the optimization for a scene is completed for all road participants this information may be supplied to the filter.

Link 820 indicates that the process s 802 to 816 may be repeated in each time frame to detect the position of both static and dynamic objects, and the direction of motion of dynamic objects.

In the following, various examples are provided with reference to the aspects described above.

Example 1 is a method of image processing. The method may include determining a candidate tuple from at least two images that are taken at different times. The candidate tuples are determined using at least odometry sensor information. The couple of subsequent images have been detected by a moving image sensor moved by a vehicle. The odometry sensor information is detected by a sensor moved by the vehicle. The method may further include classifying the candidate tuples into a static tuple or a dynamic tuple, wherein the static tuple represents a static object within the couple of subsequent images, and the dynamic tuple represents a moving object within the couple of subsequent images.

In Example 2, the subject matter of Example 1 may optionally include that the candidate tuple is classified into a static tuple or a dynamic tuple by comparing a first angle of translation of the vehicle as estimated from the odometry sensors in the vehicle with a second angle of translation of the vehicle as estimated from the candidate tuples.

In Example 3, the subject matter of any one of Examples 1 or 2 may optionally include that a candidate tuple is a static tuple if the candidate tuple satisfies the following equation:

$$Y_1*(T_{cameraX}*\cos(\theta)-T_{cameraY}*\sin(\theta))-Y_2*(T_{cameraY}+T_{cameraX}*X_1)+Y_1*X_2*(T_{cameraX}*\cos(\theta)+T_{cameraY}*\sin(\theta))=0$$

wherein $X_1, Y_1$ are the coordinates of a feature in a candidate tuple at a first time frame 1;

$X_2, Y_2$ are the coordinates of an equivalent feature in a candidate tuple at a second time frame 2; and $T_{cameraX}, T_{cameraY}$ are the image sensor translations along the axes.

In Example 4, the subject matter of any one of Examples 1 to 3 may optionally include that the method further includes computing image sensor translations along the axes with respect to a position of the image sensor at time frames when the pictures corresponding to the candidate tuple were taken.

In Example 5, the subject matter of any one of Examples 1 to 4 may optionally include that a candidate tuple is a dynamic tuple if it is not a static tuple.

In Example 6, the subject matter of any one of Examples 1 to 5 may optionally include that a candidate tuple is classified as a dynamic tuple based on a direction of motion.

In Example 7, the subject matter of any one of Examples 1 to 6 may optionally include that the classification of dynamic tuples on the bases of the direction of motion is determined in accordance with:

$$f(\vartheta,\varphi)=X_2Y_1\cos(\varphi-\vartheta)-X_1Y_2\cos(\vartheta)+\sin(\vartheta)+Y_1\sin(\varphi-\vartheta)=0$$

wherein $X_1$ and $Y_1$ correspond to the position of the image sensor at the time of determination of the first image;

$X_2$ and $Y_2$ correspond to the position of the image sensor at the time of determination of the second image;

$\varphi$ corresponds to the angle between the direction of motion of the vehicle at a first time and the direction of motion followed by the vehicle while moving from its position at a first time to its position at a second time;

$\vartheta$ corresponds to the angle between the direction of motion of the vehicle at the second time and the direction of motion followed by the vehicle while moving from its position at the first time to its position at the second time.

In Example 8, the subject matter of any one of Examples 1 to 7 may optionally include that an odometry sensor detects changes in the motion of the vehicle.

In Example 9, the subject matter of any one of Examples 1 to 8 may optionally include that a change in the motion of the vehicle corresponds to a change in the direction of motion of the vehicle.

In Example 10, the subject matter of any one of Examples 1 to 9 may optionally include that the image sensor includes a camera.

In Example 11, the subject matter of Example 10 may optionally include that the camera includes a Bellow mono optical camera.

In Example 12, the subject matter of any one of Examples 1 to 11 may optionally include that the vehicle receives information about other objects and vehicles in the pre-determined region through communication.

In Example 13, the subject matter of any one of Examples 1 to 12 may optionally include that the method further includes performing information fusion to merge and position information about objects in the pre-determined region detected with the image sensor, and objects detected with the image sensor and objects detected through communication.

In Example 14, the subject matter of Example 13 may optionally include that the information fusion is performed using Multibody Structure Information Fusion.

Example 15 is an image processing device. The image processing device may include a determiner configured to determine a candidate tuple from at least two images that are taken at different times. The candidate tuples are determined using at least odometry sensor information. The couple of subsequent images have been detected by a moving image sensor moved by a vehicle. The odometry sensor information is detected by a sensor moved by the vehicle. The image processing device may further include a classifier configured to classify the candidate tuples into a static tuple or a dynamic tuple. The static tuple represents a static object within the couple of subsequent images, and the dynamic tuple represents a moving object within the couple of subsequent images.

In Example 16, the subject matter of Example 15 may optionally include that the classifier is further configured to classify the candidate tuple into a static tuple or a dynamic tuple by comparing a first angle of translation of the vehicle as estimated from the odometry sensors in the vehicle, with a second angle of translation of the vehicle as estimated from the candidate tuples.

In Example 17, the subject matter of any one of Examples 15 or 16 may optionally include that the classifier is further configured to classify a candidate tuple as a static tuple if the candidate tuple satisfies the following equation:

$$Y_1*(T_{cameraX}*\cos(\theta)-T_{cameraY}*\sin(\theta))-Y_2*(T_{cameraY}+T_{cameraX}*X_1)+Y_1*X_2*(T_{cameraX}*\cos(\theta)+T_{cameraY}*\sin(\theta))=0$$

wherein $X_1, Y_1$ are the coordinates of a feature in a candidate tuple at a first time frame 1;

$X_2, Y_2$ are the coordinates of an equivalent feature in a candidate tuple at a second time frame 2; and $T_{cameraX}, T_{cameraY}$ are the image sensor translations along the axes.

In Example 18, the subject matter of any one of Examples 15 to 17 may optionally include that the determiner is further configured to compute image sensor translations along the axes with respect to a position of the image sensor at time frames when the pictures corresponding to the candidate tuple were taken.

In Example 19, the subject matter of any one of Examples 15 to 18 may optionally include that the classifier is further configured to classify a candidate tuple as a dynamic tuple if it is not classified as a static tuple.

In Example 20, the subject matter of any one of Examples 15 to 19 may optionally include that the classifier is further configured to classify a candidate tuple as a dynamic tuple based on direction of motion.

In Example 21, the subject matter of any one of Examples 15 to 20 may optionally include that the classifier is further configured to classify dynamic tuples on the bases of the direction of motion is determined in accordance with:

$$f(\vartheta,\varphi)=X_2Y_1\cos(\varphi-\vartheta)-X_1Y_2\cos(\vartheta)+\sin(\vartheta)+Y_1\sin(\varphi-\vartheta)=0$$

wherein $X_1$ and $Y_1$ correspond to the position of the image sensor at the time of determination of the first image;

$X_2$ and $Y_2$ correspond to the position of the image sensor at the time of determination of the second image;

$\varphi$ corresponds to the angle between the direction of motion of the vehicle at a first time and the direction of motion followed by the vehicle while moving from its position at a first time to its position at a second time;

$\vartheta$ corresponds to the angle between the direction of motion of the vehicle at the second time and the direction of motion followed by the vehicle while moving from its position at the first time to its position at the second time.

In Example 22, the subject matter of any one of Examples 15 to 21 may optionally include that the image processing device further includes the odometry sensor coupled with the determiner and the vehicle and configured to provide odometry sensor information.

In Example 23, the subject matter of Example 22 may optionally include that the odometry sensor is configured to detect changes in the motion of the vehicle;

In Example 24, the subject matter of Example 23 may optionally include that a change in the motion of the vehicle corresponds to a change in the direction of motion of the vehicle;

In Example 25, the subject matter of any one of Examples 15 to 24 may optionally include that the image processing device further includes the image sensor coupled to the determiner and the vehicle and configured to provide a plurality of subsequent images.

In Example 26, the subject matter of Example 25 may optionally include that the image sensor includes a camera.

In Example 27, the subject matter of Example 26 may optionally include that the camera includes a Bellow mono optical camera.

In Example 28, the subject matter of any one of Examples 15 to 27 may optionally include that the image processing device further includes at least one antenna configured to perform vehicle to everything communication.

In Example 29, the subject matter of Example 28 may optionally include that the at least one antenna is configured to perform vehicle to vehicle communication.

Example 30 is an image processing device. The image processing device may include at least one image sensor coupled to a vehicle. The at least one image sensor is configured to take successive pictures of a pre-determined region. The image processing device may further include at least one odometer sensor coupled to the vehicle and configured to record information on the vehicle movements and at least one antenna configured to receive communication about other objects and vehicles in the predetermined area. The information about objects and vehicles includes position information and direction of motion information. The image processing device may further include a memory configured to store at least one map of the predetermined region indicating the position of objects and vehicles in the predetermined region, and a processor configured to detect at least one object using information from the image sensors, determine whether the object is a static object or a dynamic object, compute direction of the object if the object is determined as a dynamic object, fuse the information received from the at least one image sensor and from the at least one antenna, and generate a map of the predetermined region including information about the static object, dynamic object, and the direction of dynamic object.

In Example 31, the subject matter of Example 30 may optionally include that the at least one odometer sensor is configured to monitor the vehicle motion.

In Example 32, the subject matter of any one of Examples 30 or 31 may optionally include that a change in the motion of the vehicle corresponds to a change in the direction of motion of the vehicle.

In Example 33, the subject matter of any one of Examples 30 to 32 may optionally include that the at least one image sensor includes a camera.

In Example 34, the subject matter of Example 33 may optionally include that the camera includes a Bellow mono optical camera.

In Example 35, the subject matter of any one of Examples 30 to 34 may optionally include that the at least one antenna is configured to perform vehicle to everything communication.

In Example 36, the subject matter of Example 35 may optionally include that the at least one antenna is configured to perform vehicle to vehicle communication;

In Example 37, the subject matter of any one of Examples 30 to 36 may optionally include that the image processing device further includes an information fusion device configured to fuse information received via the at least one antenna with information derived by the at least one image sensor.

In Example 38, the subject matter of Example 37 may optionally include that the information fusion device is configured to perform information fusion in accordance with a Multibody Structure Information Fusion.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of image processing, the method comprising:
determining a candidate tuple from at least two images that are taken at different times, wherein the candidate tuples are determined using at least odometry sensor information, and wherein the couple of subsequent images have been detected by a moving image sensor moved by a vehicle, wherein the odometry sensor information is detected by a sensor moved by the vehicle; and
classifying the candidate tuples into a static tuple or a dynamic tuple, wherein the static tuple represents a static object within the couple of subsequent images, and the dynamic tuple represents a moving object within the couple of subsequent images, and wherein the candidate tuple is classified into a static tuple or a dynamic tuple by comparing a first angle of translation of the vehicle as estimated from the odometry sensors in the vehicle with a second angle of translation of the vehicle as estimated from the candidate tuples.

2. The method of claim 1,
wherein a candidate tuple is a static tuple if the candidate tuple satisfies the following equation:

$$Y_1*(T_{cameraX}*\cos(\theta)-T_{cameraY}*\sin(\theta))-Y_2*(T_{cameraY}+T_{cameraX}*X_1)+Y_1*X_2*(T_{cameraX}*\cos(\theta)+T_{cameraY}*\sin(\theta))=0$$

wherein
$X_1, Y_1$ are the coordinates of a feature in a candidate tuple at a first time frame 1;
$X_2, Y_2$ are the coordinates of an equivalent feature in a candidate tuple at a second time frame 2; and
$T_{cameraX}, T_{cameraY}$ are the image sensor translations along the axes.

3. The method of claim 1, further comprising:
computing image sensor translations along the axes with respect to a position of the image sensor at time frames when the pictures corresponding to the candidate tuple were taken.

4. The method of claim 1,
wherein a candidate tuple is a dynamic tuple if it is not a static tuple.

5. The method of claim 1,
wherein a candidate tuple is classified as a dynamic tuple based on a direction of motion.

6. The method of claim 5,
wherein the classification of dynamic tuples on the basis of the direction of motion is determined in accordance with:

$$f(\vartheta,\varphi)=X_2Y_1\cos(\varphi-\vartheta)-X_1Y_2\cos(\vartheta)+\sin(\vartheta)+Y_1\sin(\varphi-\vartheta)=0$$

wherein
$X_1$ and $Y_1$ correspond to the position of the image sensor at the time of determination of the first image;
$X_2$ and $Y_2$ correspond to the position of the image sensor at the time of determination of the second image;
$\varphi$ corresponds to the angle between the direction of motion of the vehicle at a first time and the direction of motion followed by the vehicle while moving from its position at a first time to its position at a second time;
$\vartheta$ corresponds to the angle between the direction of motion of the vehicle at the second time and the direction of motion followed by the vehicle while moving from its position at the first time to its position at the second time.

7. The method of claim 1,
wherein an odometry sensor detects changes in the motion of the vehicle.

8. The method of claim 1,
wherein the image sensor comprises a camera.

9. The method of claim 1,
wherein the vehicle receives information about other objects and vehicles in the pre-determined region through communication.

10. The method of claim 1, further comprising:
performing information fusion to merge and position information about objects in the pre-determined region detected with the image sensor, and objects detected with the image sensor and objects detected through communication.

11. The method of claim 1, wherein the candidate tuple is classified as a static tuple when a difference between the first angle and the second angle is smaller than a predetermined threshold.

12. An image processing device, comprising:
a determiner configured to determine a candidate tuple from at least two images that are taken at different times, wherein the candidate tuples are determined using at least odometry sensor information, and wherein the couple of subsequent images have been detected by a moving image sensor moved by a vehicle, wherein the odometry sensor information is detected by a sensor moved by the vehicle; and
a classifier configured to classify the candidate tuples into a static tuple or a dynamic tuple, wherein the static tuple represents a static object within the couple of subsequent images, and the dynamic tuple represents a moving object within the couple of subsequent images, and wherein the classifier is further configured to classify the candidate tuple into a static tuple or a dynamic tuple by comparing a first angle of translation of the vehicle as estimated from the odometry sensors in the vehicle, with a second angle of translation of the vehicle as estimated from the candidate tuples.

13. The image processing device of claim 12,
wherein the classifier is further configured to classify a candidate tuple as a static tuple if the candidate tuple satisfies the following equation:

$$Y_1*(T_{cameraX}*\cos(\theta)-T_{cameraY}*\sin(\theta))-Y_2*(T_{cameraY}+T_{cameraX}*X_1)+Y_1*X_2*(T_{cameraX}*\cos(\theta)+T_{cameraY}*\sin(\theta))=0$$

wherein
$X_1, Y_1$ are the coordinates of a feature in a candidate tuple at a first time frame 1;
$X_2, Y_2$ are the coordinates of an equivalent feature in a candidate tuple at a second time frame 2; and
$T_{cameraX}, T_{cameraY}$ are the image sensor translations along the axes.

14. The image processing device of claim 12,
wherein the determiner is further configured to compute image sensor translations along the axes with respect to a position of the image sensor at time frames when the pictures corresponding to the candidate tuple were taken.

15. The image processing device of claim 12,
wherein the classifier is further configured to classify dynamic tuples on the bases of the direction of motion is determined in accordance with:

$$f(\vartheta,\varphi)=X_2 Y_1 \cos(\varphi-\vartheta)-X_1 Y_2 \cos(\vartheta)+\sin(\vartheta)+Y_1 \sin(\varphi-\vartheta)=0$$

wherein
$X_1$ and $Y_1$ correspond to the position of the image sensor at the time of determination of the first image;
$X_2$ and $Y_2$ correspond to the position of the image sensor at the time of determination of the second image;
$\varphi$ corresponds to the angle between the direction of motion of the vehicle at a first time and the direction of motion followed by the vehicle while moving from its position at a first time to its position at a second time;
$\vartheta$ corresponds to the angle between the direction of motion of the vehicle at the second time and the direction of motion followed by the vehicle while moving from its position at the first time to its position at the second time.

16. The image processing device of claim 12, further comprising:
the odometry sensor coupled with the determiner and the vehicle and configured to provide odometry sensor information.

17. An image processing device, comprising:
at least one image sensor coupled to a vehicle, wherein the at least one image sensor is configured to take successive pictures of a pre-determined region;
at least one odometer sensor coupled to the vehicle and configured to record information on the vehicle movements;
at least one antenna configured to receive communication about other objects and vehicles in the predetermined area, wherein the information about objects and vehicles includes position information and direction of motion information;
a memory configured to store at least one map of the predetermined region indicating the position of objects and vehicles in the predetermined region;
a processor configured to
  detect at least one object using information from the image sensors, wherein the information comprises at least two images that are taken at different times, each of the at least two successive images including a respective a candidate tuple corresponding to the at least one object, wherein the candidate tuples are determined using at least odometry sensor information provided by the at least one odometer sensor coupled to the vehicle, and wherein the at least two successive images have been detected by the at least one image sensor coupled to the vehicle;
  determine whether the object is a static object or a dynamic object by classifying the candidate tuples into a static tuple or a dynamic tuple, wherein the static tuple represents a static object within the at least two images, and the dynamic tuple represents a moving object within the at least two successive images, and wherein the candidate tuple is classified into a static tuple or a dynamic tuple by comparing a first angle of translation of the vehicle as estimated from the at least one odometer sensor coupled to the vehicle with a second angle of translation of the vehicle as estimated from the candidate tuples;
  compute direction of the object if the object is determined as a dynamic object;
  fuse the information received from the at least one image sensor and from the at least one antenna;
  generate a map of the predetermined region including information about the static object, dynamic object, and the direction of dynamic object.

18. The image processing device of claim 17,
wherein the at least one odometer sensor is configured to monitor the vehicle motion.

19. The image processing device of claim 17,
wherein the at least one antenna is configured to perform vehicle to everything communication.

* * * * *